(12) United States Patent
Winkler

(10) Patent No.: US 8,892,779 B2
(45) Date of Patent: Nov. 18, 2014

(54) VIRTUAL MACHINE ALLOCATION AT PHYSICAL RESOURCES

(75) Inventor: Timothy P. Winkler, Skokie, IL (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 13/468,791

(22) Filed: May 10, 2012

(65) Prior Publication Data

US 2013/0304899 A1   Nov. 14, 2013

(51) Int. Cl.
*G06F 15/16* (2006.01)
*G06F 12/00* (2006.01)

(52) U.S. Cl.
USPC ........................................................ 709/250

(58) Field of Classification Search
USPC .................................. 709/203, 223–229, 250
See application file for complete search history.

(56) References Cited

U.S. PATENT DOCUMENTS

| | | |
|---|---|---|
| RE39,284 E | 9/2006 | Marisetty |
| 7,424,632 B2 | 9/2008 | Powers et al. |
| 7,607,129 B2 | 10/2009 | Rosu et al. |
| 7,784,053 B2 | 8/2010 | Casey et al. |
| 8,429,675 B1 * | 4/2013 | Radhakrishnan et al. .... 719/319 |
| 2009/0259345 A1 | 10/2009 | Kato et al. |
| 2009/0293056 A1 | 11/2009 | Ferris |
| 2011/0072293 A1 | 3/2011 | Mazzaferri et al. |
| 2011/0173470 A1 | 7/2011 | Tran |
| 2011/0239010 A1 | 9/2011 | Jain et al. |
| 2011/0302578 A1 * | 12/2011 | Isci et al. .......................... 718/1 |
| 2012/0036515 A1 * | 2/2012 | Heim ............................ 718/105 |
| 2012/0324445 A1 * | 12/2012 | Dow et al. ........................ 718/1 |
| 2013/0290953 A1 * | 10/2013 | Li et al. ............................ 718/1 |
| 2013/0305092 A1 * | 11/2013 | Jayachandran et al. ......... 714/37 |

* cited by examiner

*Primary Examiner* — Zarni Maung
(74) *Attorney, Agent, or Firm* — Terrile, Cannatti, Chambers & Holland, LLP; Robert W. Holland

(57) ABSTRACT

Communications between virtual machines are monitored to identify virtual machines that have an affinity with each other, such as where the virtual machines have greater than a threshold of communication between each other. An affinity table tracks virtual machines having an affinity relationship and is referenced upon start-up or migration of a virtual machine so that a starting-up or migrating virtual machine will run on the same processing resource as virtual machines with which it has an affinity relationship.

17 Claims, 3 Drawing Sheets

VIRTUAL MACHINE ALLOCATION AT PHYSICAL RESOURCES

BACKGROUND OF THE INVENTION

1. Field of the Invention

The present invention relates in general to the field of virtual machines, and more particularly to a virtual machine allocation at physical resources.

2. Description of the Related Art

Virtual machines help to more efficiently use physical processing resources by allowing one computer system to support functions normally performed by multiple separate computer systems. A virtual machine is an operating system executing over a physical processing resource, typically a server, to appear as its own physical resource. By virtualizing a server environment in a cloud-based network, a single physical resource can support multiple virtual machines in a flexible manner that provides improved utilization of the processing resource. Further, if a physical processing resource in a cloud-based network becomes over-utilized, virtual machines can migrate to other physical processing resources of the cloud-based network that have processing capacity.

Virtual machines are typically hosted across an arbitrary set of physical hardware, such as server computers that include load balancing of processing resources to improve scalability and infrastructure stability. Conventional load balancing techniques focus on processor and memory usage at each physical hardware resource to spread processing and memory usage evenly across all available physical hardware resources. Although conventional load balancing helps to avoid some physical hardware resources becoming overwhelmed while other physical hardware resources are underutilized, in some instances this may increase power consumption. For example, conventional load balancing can result in all physical hardware resources running at underutilized rates, so that a relatively high overhead of power consumption provides a relatively small workload production.

SUMMARY OF THE INVENTION

Therefore, a need has arisen for a system and method which associates virtual machines that have an affinity to each other for hosting at common physical hardware resources.

In accordance with the present invention, a system and method are provided which substantially reduce the disadvantages and problems associated with previous methods and systems for load balancing of virtual machines across physical hardware resources. A first virtual machine initiates to a processing resource that supports a second virtual machine if an affinity relationship exists between the first and second virtual machines. Affinity relationships are identified by monitoring communications between plural virtual machines to detect greater than a predetermined threshold of communications between virtual machine pairs.

More specifically, plural processing resources, such as servers, interfaced through a network, such as a cloud network environment, support plural virtual machines. A monitoring module monitors communications between virtual machines to populate an affinity table with associated virtual machines having greater than a predetermined threshold of communication between each other. If a first and second virtual machine are identified in the affinity table as associated with each other, then on start-up or migration of the first virtual machine, a co-location module looks up the first virtual machine in the affinity table to find the affinity relationship with the second virtual machine. The co-location module attempts to co-locate the first and second virtual machines at a common processing resource, such as by starting-up or migrating the first virtual machine to the processing resource that supports the second virtual machine or by initiating both the first and second virtual machines at a new common processing resource that has adequate capacity to execute both the first and second virtual machines.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
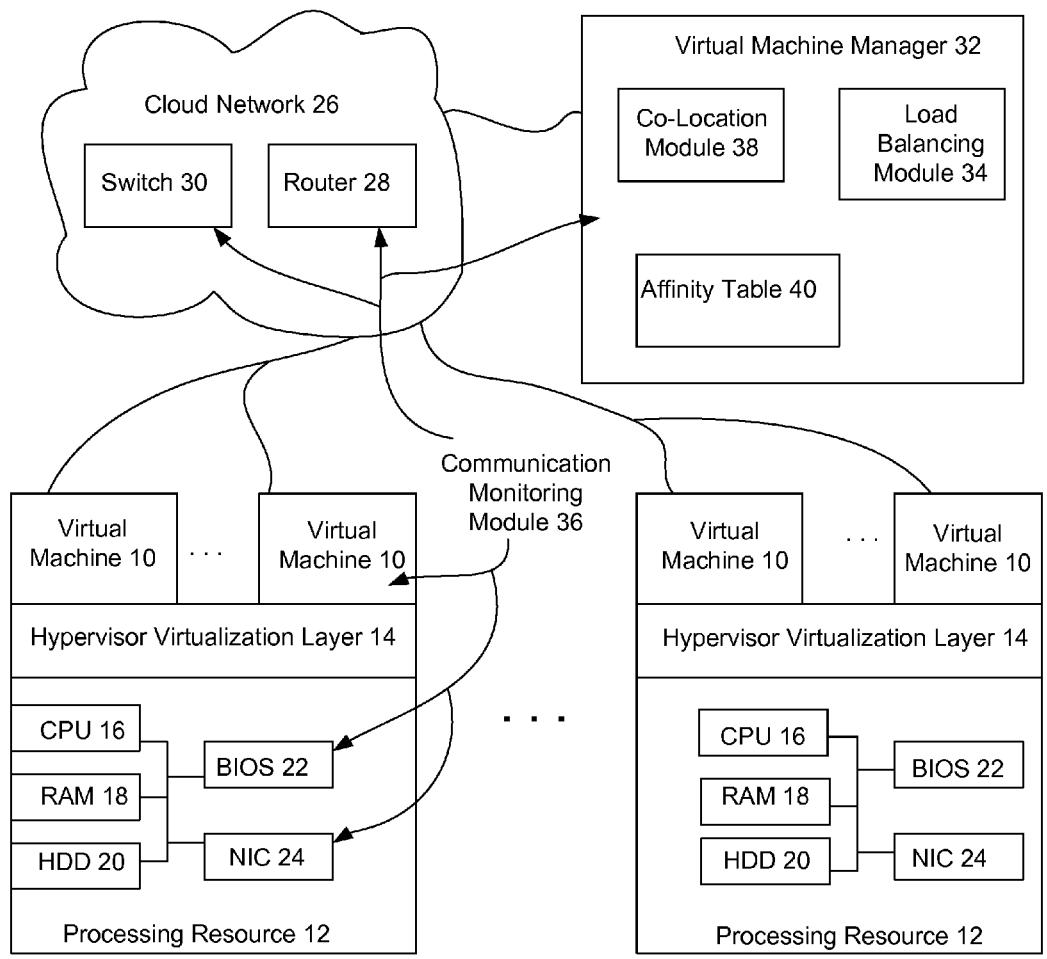
FIG. 1 depicts a block diagram of a system that co-locates virtual machines to a common processing resource when the virtual machines have an affinity with each other.

A system and method provides monitoring of virtual machines executing over processing resources of a network environment to identify virtual machines having an affinity to each other based upon a threshold level of communication between the virtual machines. In order to improve the efficiency of the virtual machines and reduce power consumption of the processing resources, virtual machines having an affinity for each other are co-located to a common processing resource that has processing capacity to support the virtual machines, such as a common server. Co-location of virtual machines with an affinity helps to reduce power consumption by supporting related operations on a common processing resource, such as web page server and its related database, and by reducing the load on network hardware that supports communication between virtual machines, such as routers and switches.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a block diagram depicts a system that co-locates virtual machines 10 to a common processing resource 12 when the virtual machines 10 have an affinity with each other. Virtual machines 10 are isolated guest operating systems installed within a host operating system, such as a hypervisor virtualization layer 14 that runs over a processing resource 12. Processing resources 12 includes hardware resources that cooperate to process information, such as a central processor unit (CPU) 16, RAM 18, a hard disk drive 20 and firmware supported on a chipset, such as BIOS 22. Processing resources 12 communicate with each other using a network interface card (NIC) 24 interfaced with a cloud network 26. For example, cloud network 26 uses Internet Protocol addresses to communicate packets between virtual machines 10 through routers 28 and switches 30. Virtual machines 10 perform processing functions that appear as if they are performed by independent physical processing resources running independent applications. For example, a virtual machine 10 interacts through cloud network 26 as an independent web page server that serves a web page to clients. Another virtual machine 10 interacts through cloud network 26 as an independent database that supports the web page server.

A virtual machine manager 32 interfaced with cloud network 26 manages the operation of virtual machines 10, such as starting-up, shutting down or migrating virtual machines 10 at processing resources 12. The ability to migrate virtual machines 10 between different processing resources 12 helps to utilize processing resources 12 in an efficient manner. A load balancing module 34 monitors the utilization of processing resources 12 and migrates or otherwise allocates virtual machines 10 so that the processing load for supporting virtual machines 10 is shared across the processing resources. For example, load balancing module 34 is an application that retrieves processor and memory utilization from processing resources 12 and then applies the processor and memory utilization to balance processing tasks between processing resources 12. Load balancing module 34 attempts to balance the processing load by starting-up virtual machines 10 at processing resources 12 that have a relatively smaller load and by migrating virtual machines 10 between processing resources 12 when any one processing resource 12 becomes relatively over-utilized or underutilized.

During normal operations under the management of load balancing module 34, the processing load borne by each processing resource 12 tends to equalize as virtual machines are allocated between processing resources 12; however, power use by processing resources 12 can increase in some instances when the load is balanced. For example, having all processing resources 12 operating at a low utilization rate can mean a relatively large overhead-function power consumption for relatively small processing-function power consumption. In addition, load balancing based upon processor and memory utilization does not take into account the load placed upon components that support communication through cloud network 26, such as routers 28 and switches 30. In order to provide more efficient load balancing and power usage, one or more communication monitoring modules 36 monitor communications between virtual machines 10 so that a co-location module 38 can locate virtual machines 10 having an affinity to each other on a common processing resource 12. When virtual machines 10 with an affinity to each other are co-located at a common processing resource 12, the load across cloud network 26 decreases as the amount of communications decrease so that less power consumption is needed to support cloud network 26 processing resources, such as routers 28 and switches 30. In addition, co-location of virtual machines 10 on a common processing resource 12 can reduce power consumption by processing resources 12 in some instances. For instance, a reduced load created on a given processing resource 12 by migration of a virtual machine 10 for co-location with another virtual machine allows the processing resource 12 with the reduced load to employ power saving strategies, such as throttling its processor.

Communications monitoring modules 36 are software or firmware instructions that execute on various hardware devices to monitor communications between virtual machines 10. Once a pair of virtual machines is identified as having a threshold level of communications, the pair is entered in an affinity table 40 as having an affinity for each other. As an example, communications monitoring modules 36 are located in each virtual machine 10 to count the number of packets or amount of data that each virtual machine 10 communicates to other virtual machines 10 over a set time period. The threshold to define an affinity is set through virtual machine manager 32. Once communications monitoring module 36 detects the threshold, it updates affinity table 40 to associate the virtual machines 10 having the threshold with each other. If the virtual machines 10 stop communicating with each other at the threshold level, then communications monitoring module 36 removes the virtual machines 10 from affinity table 40. As an alternative to monitoring communications at a virtual machine level, communications may be monitoring by distributing one or more communications monitoring modules 36 at various hardware, software or firmware resources that support network communications, such as at NICs 24, within BIOS 22, in hypervisor virtualization layer 14, in cloud network 22 resources like routers 28 and switches 30, and within virtual machine monitor 32. In one example embodiment, a first virtual machine is a web page server and a second virtual machine is a database server that supports the web page server. An affinity exists between the first and second virtual machines when the web page server serves a web page to clients at a predetermined rate and retrieves data from the second virtual machine to support service of the web page to the clients. The affinity can end if clients do not request the webpage at a sufficient rate to meet the threshold level of communication. An end user interacting with communications monitoring module 36 through virtual machine manager 32 can set the threshold level of communication as desired to cause co-location of virtual machines.

Once affinity table 40 is populated with virtual machine pairs having an affinity, co-location module 38 references affinity table 40 to co-locate virtual machines having an affinity at a common processing resource when practical. In one embodiment, co-location module 38 detects an initial entry of a virtual machine affinity pair in affinity table and, in response to detecting, initiates migration of one or both virtual machines 10 to a common processing resource 12. For example, co-location module 38 determines the load of the processing resource 12 that supports each virtual machine 10 of an affinity pair and migrates one of the affinity pair from the processing resource 12 having the greater load to the processing resource 12 of the other virtual machine 10. As another example, co-location module 38 interfaces with load balancing module 34 to identify a processing resource 12 to which both virtual machines 10 of the affinity pair can migrate. For instance, if both virtual machines 10 are located on different processing resources that have a relatively high load, load balancing module 34 can direct migration of both virtual machines to a new processing resource 12 with adequate processing capacity to execute both virtual machines 10.

In one example embodiment, five processing resources 12 host five virtual machines 10 and interface through a router 28. Each processing resource 12 has processing and memory capability to host ten virtual machines each. The power usage of each processing resource 12 equals the power required to run n hosted virtual machines plus some overhead of the hardware. The power usage of the router is power required to transmit data between hosts plus some overhead of its hardware. Load balancing module 34 powers up all five host processing resources 12 and load balances by running one virtual machine 10 on each processing resource 12 to balance CPU and memory utilization at each host processing resource 12. After monitoring communications between virtual machines 10, an affinity is identified between two or more virtual machines so that co-location module 38 migrates virtual machines 10 with an affinity to a common processing resource 12. Co-location of two or more virtual machines 10 at a common processing resource 12 will leave at least one processing resource 12 idle so that it can enter a power saving mode. With virtual machines that have an affinity co-located on a common host, network traffic is reduced so that router 28 has reduced power consumption. In an ideal situation, all virtual machines will have an affinity and will co-locate on one processing resource 12 so that at least some of the processing resources 12 can power down and router 28 will have no virtual machine-to-virtual machine communications.

Figure 2:
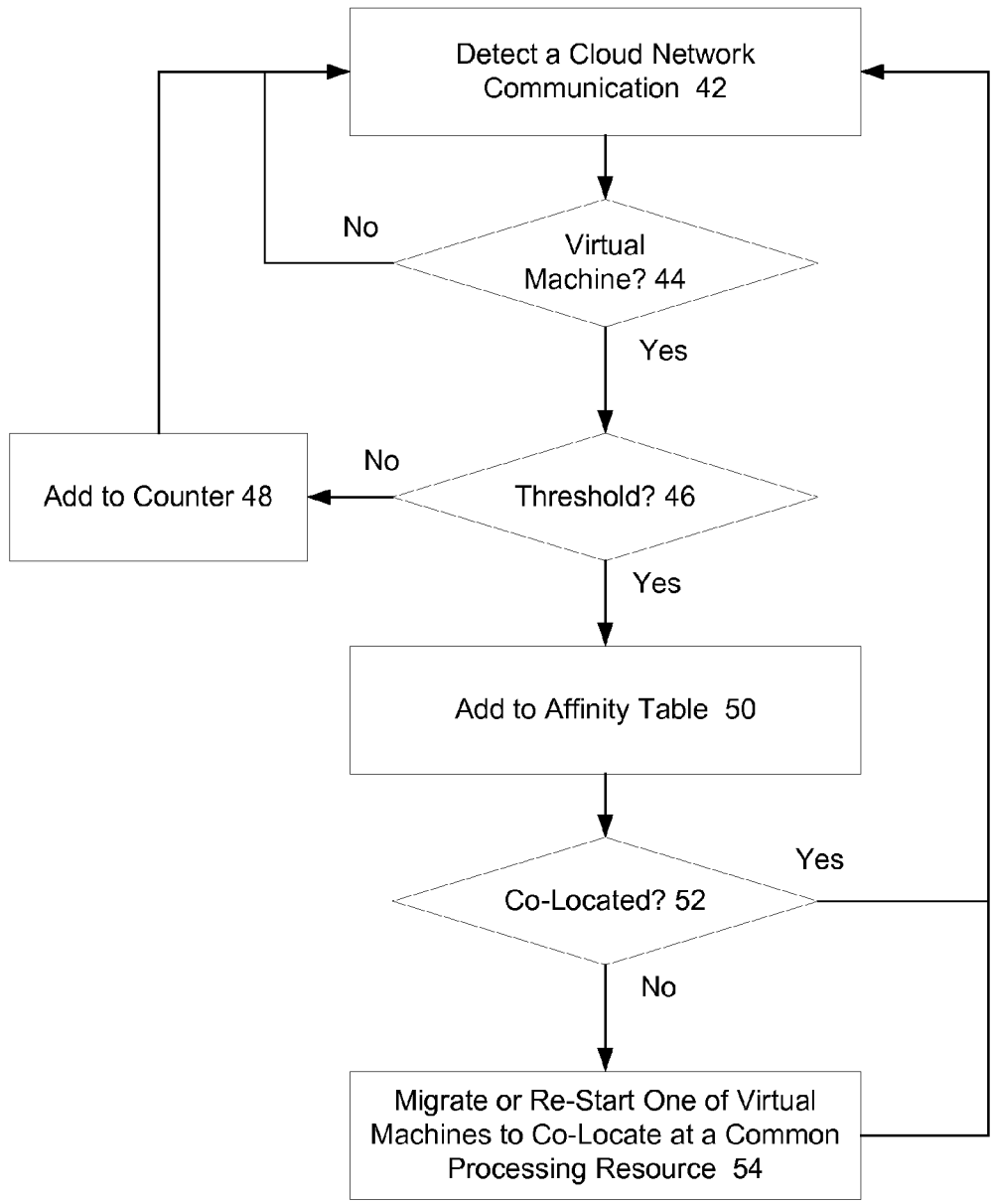
FIG. 2 depicts a flow diagram of a process for detecting virtual machines having an affinity with each other defined by a threshold level of communication between the virtual machines.

Referring now to FIG. 2, a flow diagram depicts a process for detecting virtual machines having an affinity with each other defined by a threshold level of communication between the virtual machines. The process starts at step 42 with the detection of communications by a communications monitor. At step 44, a determination is made of whether the detected communication is between virtual machines. The detection of communications and determination of the nature of the communications can occur at various hardware, software and firmware levels within a processing resource or cloud network. For example, a virtual machine at an application level tracks functions that create or request information from other virtual machines. Alternatively, a virtual machine tracks information received at an application level from another virtual machine. As another example, packet inspection during communication determines that a network destination address and origination address correspond to virtual machines. In alternative embodiments, alternative detection and inspection techniques are used to identify communications between virtual machines. If a detected communication is determined at step 44 as not between virtual machines, the process returns to step 42 to monitor the next communication. If at step 44 a detected communication is determined as between virtual machines, the process continues to step 46 to determine if a threshold of communications exists between the virtual machines. The threshold is measured by one or more metrics, such as a number of packets, a quantity of information or a frequency of the occurrence of communications. If the threshold of communications is not met between the virtual machines, the process continues to step 48 to count the communication as qualified towards the threshold and then returns to step 42 to detect the next communication.

If at step 46 the threshold is met for communications between the virtual machines, then the process continues to step 50 to add the virtual machine pair to the affinity table as having an affinity with each other. At step 52, a determination is made of whether the newly added virtual machine pair is co-located on a common processing resource. If the virtual machine pair is co-located on a common processing resource, the process returns to step 42 to monitor the next communication. If the newly-added virtual machine pair is not co-located, the process continues to step 54 to determine whether to perform a migration of one or both of the virtual machine pair in order to co-locate them on a common processing resource. In one embodiment, co-location of a pair of virtual machines that have an affinity for each other is delayed until one of the virtual machines shuts down or becomes inactive. For example, after a virtual machine of an affinity pair shuts down, then on a subsequent start-up the virtual machine pair will co-locate. In an alternative embodiment, more aggressive virtual machine management initiates a migration of one or both virtual machines in an affinity pair in order to co-locate the virtual machines to a common processing resource. After initiation of migration of the virtual machines to a common processing resource, the process returns to step 42 to detect the next communication.

Figure 3:
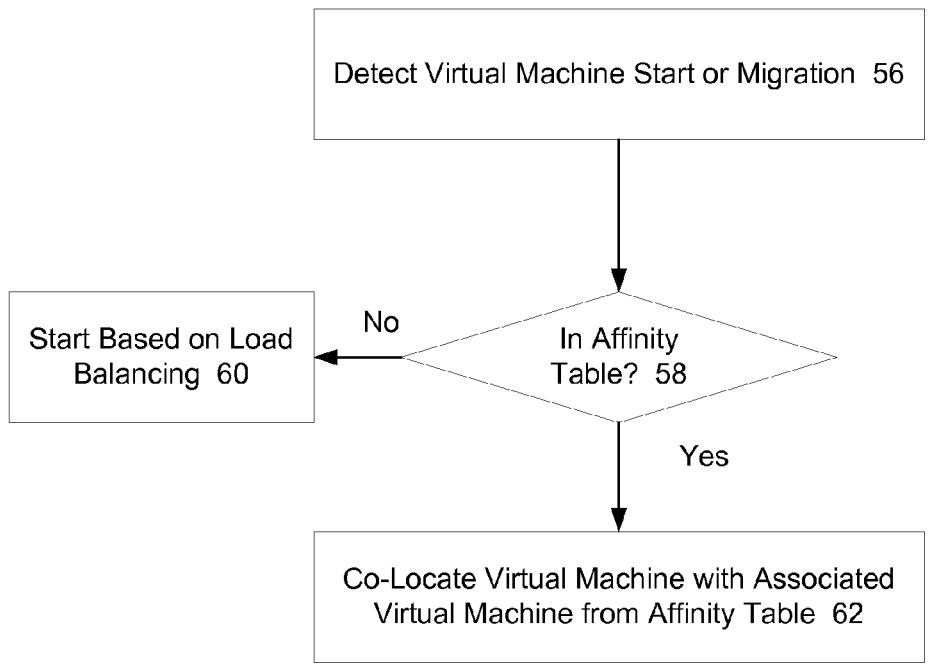
FIG. 3 depicts a flow diagram of a process for co-locating virtual machines that have an affinity for each other.

Referring now to FIG. 3, a flow diagram depicts a process for co-locating virtual machines that have an affinity for each other. The process begins at step 56 with detection of a start-up or migration of a virtual machine. At step 58, a determination is made of whether the virtual machine that is starting-up or migrating has an entry in an affinity table. If not, the process continues to step 60 to start or migrate the virtual machine at location determined by load balancing. If the virtual machine has an entry in the affinity table, the process continues to step 62 to co-locate the virtual machine at a common processing resource to the one or more affinity pairs of the virtual machine. Co-location can depend upon load balancing and other considerations for the operation of the processing resources. For example, during times of heavy load, co-location may not work if no processing resource is available that has processing capacity to host both virtual machines. Further, in some instance, a virtual machine might have an affinity for plural other virtual machines so that one processing resource will need processing capacity to host plural virtual machines. In one embodiment, affinity table 40 ranks virtual machine affinities to define a priority for co-location so that virtual machines having the most frequent communication will have a higher priority to have co-location than virtual machines that have less frequent communication. Load balancing between processing resources then considers the ranking of a virtual machine in the affinity table in determining the priority of the virtual machine for co-location.

Although the present invention has been described in detail, it should be understood that various changes, substitutions and alterations can be made hereto without departing from the spirit and scope of the invention as defined by the appended claims.

What is claimed is:

1. A method for allocating plural virtual machines between plural processing resources, the method comprising:
monitoring communications between the virtual machines;
identifying first and second of the plural virtual machines having a predetermined threshold of communications with each other; and
in response to identifying, co-locating the first and second of the plural virtual machines at a common processing resource.

2. The method of claim 1 wherein the first virtual machine comprises a host to serve a web page and the second virtual machine comprises a database for the web page.

3. The method of claim 1 wherein co-locating further comprises:

storing in memory a relationship of the first and second virtual machines having the predetermined threshold of communications;
shutting down the first virtual machine;
initiating a re-start of the first virtual machine;
in response to initiating, checking if the first virtual machine has the stored relationship;
in response to checking, detecting that the first virtual machine has the stored relationship with the second virtual machine; and
in response to detecting, re-starting the first virtual machine at the processing resource where the second virtual machine is located.

4. The method of claim 3 further comprising:
determining that the processing resource where the second virtual machine is located has an over-utilized state; and
in response to determining, migrating a third virtual machine from the resource where the second virtual machine is located to another of the plural processing resources.

5. The method of claim 4 further comprising:
determining that the processing resource where the second virtual machine is located has an over-utilized state; and
in response to determining, migrating the second virtual machine to another of the plural processing resources and restarting the first virtual machine at the processing resource where the second virtual machine has migrated.

6. The method of claim 1 wherein co-locating further comprises:
determining that processing resource having the first virtual machine has a greater utilization state than the processing resource having the second virtual machine; and
in response to determining, migrating the first virtual machine to the processing resource having the second virtual machine.

7. The method of claim 1 wherein co-locating further comprises:
analyzing the plural processing resources to determine a processing resource having a utilization state adapted to support the first and second virtual machines; and
migrating the first and second virtual machines to the determined processing resource.

8. The method of claim 1 further comprising:
tracking in a table virtual machines of the plural virtual machines having the predetermined threshold of communications between each other; and
referencing the table at each start-up of a virtual machine to aid in determining a processing resource to locate the virtual machine at start-up.

9. The method of claim 1 wherein monitoring communications further comprises:
monitoring the amount of information communicated at each of the plural virtual machines with each of the other plural virtual machines;
reporting the monitored amount of information to a monitoring application; and
building a table with the monitoring application to track the amount of information reported from the plural virtual machines.

10. A system comprising:
plural processing resources interfaced through a network and operable to execute virtual machines;
a communications monitoring module executing on a processing resource and operable to identify virtual machines having a predetermined threshold of communications with each other; and a co-location module operable to co-locate virtual machines having the predetermined threshold of communication with each other at a common of the plural processing resources.

11. The system of claim 10 further comprising:

an affinity table interfaced with the communications monitoring module and operable to store a list of associated virtual machines having the predetermined threshold of communications with each other.

12. The system of claim 11 wherein the co-location module responds to a virtual machine start-up by looking up the starting-up virtual machine in the affinity table and co-locating the starting-up virtual machine at a common of the plural processing resources with an associated virtual machine from the list of associated virtual machines.

13. The system of claim 11 further comprising a load balancing module interfaced with the processing resources and operable to analyze processing resource utilization and to migrate virtual machines between processing resources to establish a predetermined utilization state at the processing resources.

14. The system of claim 13 wherein the load balancing module is further operable to look up virtual machines in the affinity table and to migrate virtual machines for load balancing so that virtual machines having a predetermined threshold of communication are co-located at a common processing resource.

15. The system of claim 10 wherein a first and second virtual machine having the predetermined threshold of communication comprise a host to serve a web page and a database for the web page.

16. The system of claim 10 wherein the predetermined threshold of communication comprises a predetermined number of network messages.

17. The system of claim 10 wherein the predetermined threshold of communication comprises a predetermined amount of data.

* * * * *